United States Patent
Gruhl et al.

(10) Patent No.: US 7,281,022 B2
(45) Date of Patent: Oct. 9, 2007

(54) SYSTEM, METHOD, AND SERVICE FOR SEGMENTING A TOPIC INTO CHATTER AND SUBTOPICS

(75) Inventors: Daniel Frederick Gruhl, San Jose, CA (US); Ramanathan Vaidhyanath Guha, Los Altos, CA (US); Andrew S. Tomkins, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 10/847,084

(22) Filed: May 15, 2004

(65) Prior Publication Data

US 2005/0256905 A1  Nov. 17, 2005

(51) Int. Cl.
*G06F 17/00* (2006.01)
(52) U.S. Cl. ........................................ 707/104.1; 704/9
(58) Field of Classification Search ............. 707/104.1; 704/9
See application file for complete search history.

(56) References Cited

U.S. PATENT DOCUMENTS

| | | | | |
|---|---|---|---|---|
| 6,052,657 | A * | 4/2000 | Yamron et al. ................. | 704/9 |
| 6,529,902 | B1 * | 3/2003 | Kanevsky et al. .............. | 707/5 |
| 2004/0143434 | A1 * | 7/2004 | Divakaran et al. ........... | 704/256 |
| 2005/0021324 | A1 * | 1/2005 | Brants et al. .................. | 704/9 |
| 2005/0216443 | A1 * | 9/2005 | Morton et al. ................. | 707/3 |

FOREIGN PATENT DOCUMENTS

EP  1 016 985 A2  *  7/2000

OTHER PUBLICATIONS

Takao et al, "Segmentation and Classification of TV News Articles Based on Speech Dictation", IEEE 1999, pp. 92-95.*
Werner et al, "Automatic Topic identification in Multimedia Broadcast Data", IEEE 2002,pp. 41-44.*
Marti A. Hearst, "TextTiling: Segmenting Text into Multi-paragraph Subtopic Passages", Association for Computational Linguistics, 1997, pp. 33-64.*

* cited by examiner

*Primary Examiner*—Uyen Le
(74) *Attorney, Agent, or Firm*—Andrew Tennent; Samuel A. Kassatly; Fleit Kain Gibbons Gutman Bongini & Bianco P.L.

(57) ABSTRACT

A topic segmenting system segments a topic into chatter and subtopics. The system decomposes a conversation into topics, producing a time-based structure for topics and subtopics in the conversation. The system extracts a large number of topics at all levels of granularity. Some of the topics extracted correspond to broad topics and some correspond to "spiky" topics or subtopics. The system comprises a process for automatically detecting spiky regions of a topic. For each possible broad topic, the present system finds regions where coverage of the broad topic overlaps significantly with the spiky region of another topic. The system then removes the spiky subtopic from the conversation. Processing is repeated until all discernable topics have been identified and removed from the conversation, yielding random topics of little duration or intensity.

25 Claims, 7 Drawing Sheets

SYSTEM, METHOD, AND SERVICE FOR SEGMENTING A TOPIC INTO CHATTER AND SUBTOPICS

CROSS-REFERENCE TO RELATED APPLICATION

The present application is related to co-pending application, titled "System, Method, and Service for Inducing a Pattern of Communication Among Various Parties," Ser. No. 10/847,113, publication number 2005-0256949, which is filed on the same date as the present application, and which is incorporated herein by reference in its entirety.

FIELD OF THE INVENTION

The present invention generally relates to the identification of topics in a stream of information such as a conversation. More particularly, the present invention pertains to a method of determining time-based characteristics of topics and subtopics derived from a conversation.

BACKGROUND OF THE INVENTION

The mainstream adoption of the Internet and Web has changed the physics of information diffusion. Until a few years ago, the major barrier for someone who wanted a piece of information to spread through a community was the cost of the technical infrastructure required to reach a large number of people. Today, with widespread access to the Internet, this bottleneck has largely been removed. In this context, personal publishing modalities such as weblogs have become prevalent. Weblogs, or "blogs," are personal online diaries managed by easy-to-use software packages that allow single-click publishing of daily entries. The contents are observations and discussions ranging from the mainstream to the startlingly personal. There are several million weblogs in existence today. The weblogs and linkages between the weblogs are referenced as "blogspace".

Unlike earlier mechanisms for spreading information at the grassroots level, weblogs are open to frequent widespread observation, and thus offer an inexpensive opportunity to capture large volumes of information flows at the individual level. Furthermore, weblogs can be analyzed in the context of current affairs due to recent electronic publication standards that allow gathering of dated news articles from sources such as Reuters and the AP Newswire. Sources such as Reuters and the AP Newswire have enormous influence on the content of weblogs.

Weblogs typically manifest significant interlinking, both within entries and in boilerplate matter used to situate the weblog in a neighborhood of other weblogs that participate in the same distributed conversation. One conventional approach to analyzing information flow blogspace analyzes the "business" of blogs, capturing bursts of activity within blog communities based on an analysis of the evolving link structure. Reference is made to R. Kumar, et al., "On the bursty evolution of blogspace", In *Proc. WWW*, 2003.

Much previous research investigating the flow of information through networks has been based upon the analogy between the spread of disease and the spread of information in networks. This analogy brings centuries of study of epidemiology to bear on questions of information diffusion. Reference is made to N. Bailey, "*The Mathematical Theory of Infectious Diseases and its Applications*", Griffin, London, 2nd edition, 1975. Classical disease-propagation models in epidemiology are based upon the cycle of disease in a host. A person is first susceptible (S) to the disease. If then exposed to the disease by an infectious contact, the person becomes infected (I) (and infectious) with some probability. The disease then runs its course in that host, who is subsequently recovered (R) (or removed, depending on the virulence of the disease).

A recovered individual is immune to the disease for some period of time, but the immunity may eventually wear off. SIR models diseases in which recovered hosts are never again susceptible to the disease as with a disease conferring lifetime immunity, like chicken pox. SIR further models a highly virulent disease from which the host does not recover. SIRS models a situation in which a recovered host eventually becomes susceptible again, as with influenza.

In blogspace, the SIRS model can be applied as follows: a blogger who has not yet written about a topic is exposed to the topic by reading the blog of a friend. She decides to write about the topic, becoming infected. The topic may then spread to readers of her blog. Later, she may revisit the topic from a different perspective, and write about it again.

One conventional approach to propagation of infectious diseases studied an SIR model with mutation, in which a node u is immune to any strain of the disease that is sufficiently close to a strain with which u was previously infected. Reference is made to M. Girvan, et al., "A simple model of epidemics with pathogen mutation", *Phys. Rev. E*, 65(031915), 2002. This approach observes that for certain parameters it is possible to generate periodic outbreaks in which the disease oscillates between periods of epidemic outbreak and periods of calm while it mutates into a new form. In blogspace, one can imagine the mutation of a movie star into a political figure.

Early studies of propagation took place on "fully mixed" or "homogeneous" networks in which contacts of a node are chosen randomly from the entire network. Recent work, however, focuses on more realistic models based on social networks. In a model of small-world networks, one conventional approach to propagation of infectious diseases calculates the minimum transmission probability for which a disease can spread from one seed node to infect a constant fraction of the entire network (known as the epidemic threshold). Reference is made to C Moore, et al., "Epidemics and percolation in small-world networks", *Phys. Rev. E*, 61:5678-5682, 2000. cond-mat/9911492; and D. Watts, et al., "Collective dynamics of "small-world" networks", *Nature*, 393:440-442, 1998.

One conventional approach to modeling epidemic spreading on networks follows a power law, in which the probability that the degree of a node is k is proportional to $k^{-\alpha}$, for a constant $\alpha$ typically between 2 and 3. Many real-world networks have the power law property (reference is made to M. Mitzenmacher, "A brief history of lognormal and power law distributions", In *Allerton Comm. Control Comput.*, 2001], including a social network defined by blog-to-blog links [reference is made to R. Kumar, et al., "On the bursty evolution of blogspace", In *Proc. WWW*, 2003]. Another conventional approach analyzes an SIS model of computer virus propagation in power-law networks, showing that (in stark contrast to random or regular networks) the epidemic threshold is zero, so an epidemic always occurs. Reference is made to R. Pasto-Satorras, et al., "Epidemic spreading in scale-free networks", *Phys. Rev. Letters*, 86(14): 3200-3203, April 2001.

These results of analyses of propagation in power-law networks can be interpreted in terms of the robustness of the network to random edge failure. Suppose that each edge in the network is deleted independently with probability $(1-\epsilon)$.

The network is considered "robust" if most of the nodes are still connected. Nodes that remain in the same component as some initiator $v_0$ after the edge deletion process are exactly the same nodes that $v_0$ infects according to the disease transmission model above. The use of viral propagation through power law networks has been considered from the perspective of error tolerance of networks such as the Internet to determine the behavior of the network if a random $(1-\epsilon)$ fraction of the links in the Internet fail. Many researchers have observed that power-law networks exhibit extremely high error tolerance. Reference is made to R. Albert, et al., "Error and attack tolerance of complex networks", *Nature*, 406, July 2000; and B. Bollabas, et al., "Robustness and vulnerability of scale-free random graphs", *Internet Mathematics*, 1(1), 2003.

In blogspace, however, many topics propagate without becoming epidemics, so such a model would be inappropriate. One refinement uses a more accurate model of power-law networks, demonstrating a non-zero epidemic threshold under the SIS model in power-law networks produced by a certain generative model that takes into account the high "clustering coefficient" found in real social networks. Reference is made to V. Eguíluz, et al., "Epidemic threshold in structured scale-free networks", *Physical Review Letters*, 89, 2002. cond-mat/0205439 and D. Watts, et al., "Collective dynamics of 'small-world' networks", *Nature*, 393: 440-442, 1998. The clustering coefficient is the probability that two neighbors of a node are themselves neighbors.

Another refinement modifies the transmission model by considering the flow of information through real and synthetic email networks under a model in which the probability of infection decays as the distance to the initiator $v_0$ increases. Reference is made to F. Wu, et al., "Information flow in social groups", Manuscript, 2003. Meme outbreaks under this model are typically limited in scope, following behavior of real data. A meme is an idea or a topic that spreads much like a virus through a population. The simulated spread of email viruses has been empirically examined by examining the network defined by the email address books of a user community. Reference is made to M. Newman, et al., "Email networks and the spread of computer viruses", *Phys. Rev. E*, 66(035101), 2002. A further refinement calculates the properties of disease outbreaks, including the distribution of outbreak sizes and the epidemic threshold, for an SIR model of disease propagation. Reference is made to M. Newman, "The spread of epidemic disease on networks", *Phys. Rev. E*, 66(016128), 2002.

The spread of a piece of information through a social network can also be viewed as the propagation of an innovation through the social network. For example, the URL of a website that provides a new, valuable service is such a piece of information. In the field of sociology, there has been extensive study of the "diffusion of innovation" in social networks, examining the role of "word of mouth" in spreading innovations. At a particular point in time, some nodes in the network have adopted the innovation, and others have not.

Two fundamental models for the process by which nodes adopt new ideas have been considered in the literature: threshold models and cascade models. In a threshold model, each node u in the network chooses a threshold $t_u \in [0, 1]$, typically drawn from some probability distribution. Reference is made to M. Granovetter, "Threshold models of collective behavior", *American Journal of Sociology*, 83(6): 1420-1443, 1987. Every neighboring node v of node u has a nonnegative connection weight $w_{u,v}$ so that $$\Sigma_{v \in \Gamma(u)} w_{u,v} \leq 1$$

and node u adopts if and only if $$t_u \leq \Sigma_{adopters\ v \in \Gamma(u)} w_{u,v}$$

In a cascade model, whenever a node $v \in \Gamma(u)$ that is a social contact of a node u adopts, then node u adopts with some probability $p_{v,u}$. Reference is made to J. Goldenberg, et al., "Talk of the network: A complex systems look at the underlying process of word-of-mouth", *Marketing Letters*, 12(3): 211-223, 2001. In other words, every time a node (person) close to a node u such as node v adopts, there is a chance that node u decides to "follow" node v and adopt as well.

One approach utilizes an "independent cascade model" with a given set of N nodes, some of which have already adopted. Reference is made to J. Goldenberg, et al., "Talk of the network: A complex systems look at the underlying process of word-of-mouth", *Marketing Letters*, 12(3): 211-223, 2001. At the initial state, some non-empty sets of nodes are "activated." At each successive step, some (possibly empty) sets of nodes become activated. The episode is considered over when no new activations occur. The set of nodes are connected in a directed graph with each edge (u, v) labeled with a probability $p_{u,v}$. When node u is activated in step t, each node v that has an arc (u, v) is activated with probability $p_{u,v}$. This influence is independent of the history of all other node activations. Further, if v is not activated in that time step, then u never activates v.

A "general cascade model" generalizes the independent cascade model and simultaneously generalizes the threshold models described above by discharging the independence assumption. Reference is made to D. Kempe, et al., "Maximizing the spread of influence through a social network", In *Proc. KDD*, 2003. The general cascade model addresses a related problem on social networks with a marketing motivation: assuming that innovations propagate according to such a model, and given a number k, find the k "seed" nodes $S_k^*$ that maximize the expected number of adopters of the innovation if nodes $S_k^*$ adopt initially. One can then give free samples of a product to nodes $S_k^*$, for example.

The propagation of information through a social network has also been studied from a game-theoretic perspective, in which one postulates an increase in utility for players who adopt the new innovation or learn the new information if enough of their friends have also adopted. For example, each player chooses whether to switch from videotape to DVDs; a person with friends who have made the same choice can benefit by borrowing movies. In blogspace, sharing discussion of a new and interesting topic with others in one's immediate social circle may bring pleasure or even increased status.

One game-theoretic approach considers a setting such as the following coordination game: in every time step, each node in a social network chooses a type $\{0, 1\}$. Players of type 1 have adopted the meme. Each player i receives a positive payoff for each of its neighbors that has the same type as i, in addition to an intrinsic benefit that i derives from its type. Further, each player may have a distinct utility for adopting, depending on his inherent interest in the topic. Suppose that all but a small number of players initially have type 0. This game-theoretic approach explores the question of whether players of type 1 can "take over" the graph if every node chooses to switch to type 0 with probability increasing as the number of the neighbors of i that are of type 0 increases.

There has also been work in the economics community on models of the growth of social networks when an agent u can selfishly decide to form a link with another agent v, who may have information that agent u desires to learn. There is a cost born by agent u to establish such a link, and a profit for the information that agent u learns through this link. This approach explores properties of the social network that forms under this scenario. Reference is made to V. Bala, et al., "A strategic analysis of network reliability", *Review of Economic Design*, 5:205-228, 2000 and H. Haller, et al., "Nash networks with heterogeneous agents", Working Paper Series E-2001-1, Virginia Tech, 2003.

Although the conventional technologies, analyses, and approaches to modeling transmission of information presented thus far have proven to be useful, it would be desirable to present additional improvements. Many models have been proposed to capture the methods by which the spread of infectious diseases and the spread of memes occur. Epidemiologists proceed in tracing the spread of a disease by interviewing individuals and finding reasons to believe that one person may have had contact with another.

A fundamental need for the determination of propagation of information through a network is the ability to discern topics within the information. The literature around detection and tracking of topics has focused on topics as monolithic structures that may migrate slowly from one focus to another. Study of dialogue on the other hand has focused on the structure of the dialogue rather than the evolution of the topics. However, discussions in weblogs have been shown to typically comprise ongoing discussions of broad topics and in "spikes". The broad topics comprise low-level chatter on aspects of the topic of particular interest to the participants in a conversation. The spikes are peaks in discussion regarding particular subtopics that have recently emerged in the media such as, for example, in a product announcement or news story. There are no known solutions for automatically extracting this structure from large-scale textual databases.

What is therefore needed is a system, a service, a computer program product, and an associated method for analyzing communication between parties to identify topics and the patterns into which those topics fall. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for segmenting a topic into chatter and subtopics. The present system segments a conversation into topics, producing a time-based structure for topics and subtopics in the conversation.

The present system identifies a set or collection of information about a topic such as, for example, postings on a bulletin board or blogs. The present system then characterizes different patterns into which the collection of postings about the topic may fall. The present system assumes that topics are mostly composed of "chatter" and "spikes". Chatter is an ongoing discussion whose subtopic flow is largely determined by decisions of the authors. Spikes are short-term, high-intensity discussion of real-world events that are relevant to the topic. The present system utilizes a model to capture the observed structure of chatter and spikes.

The present system extracts a large number of topics at all levels of granularity. Some of the topics extracted correspond to broad topics and some correspond to "spiky" topics or subtopics. The present system comprises a process for automatically detecting spiky regions of a topic. For each possible broad topic, the present system finds regions where coverage of the broad topic overlaps significantly with the spiky region of another topic. The present system then removes the spiky subtopic from the conversation. Processing is repeated until all discernable topics have been identified and removed from the conversation, yielding random topics of little duration or intensity.

The present system aids in understanding of how topics may travel from person to person. The present system does not have access to direct information about the source that inspired an author to post a message. Instead, the present system has access only to the surface form of the information: the sequence in which hundreds, thousands, or tens of thousands of topics spread across node space. The present system processes this information to extract topics. The topics are segmented into a time-based structure than can be analyzed to determine when conversation about a topic occurred and the source of the conversation about the topic.

A better understanding of the flow of information through networks can be a powerful tool for many applications. Recently, a number of alert-based news services have attempted to filter the large volume of online news items and identify a small number of important, high-impact stories relevant to a given topic. The explosion in the volume of news items poses a significant challenge for making these services useful. Weblogs compound this problem: while some blog postings may be sufficiently important to merit notification, it can be difficult to identify the crucial posts in high-chatter topics. Corporate press releases pose a similar problem: while some press releases are important and newsworthy, the vast majority of press releases are comparatively irrelevant marketing propaganda.

The present system enables alert-based news services to identify subtopics that are experiencing spikes. Such an approach leverages a reaction by the blogging community to external world events, as manifested by spikes in blog postings, to identify news events that are worthy of attention. The present system offers great potential through this view of the blogging community as a giant collaborative filtering mechanism built around an implicit web of trust, as manifested in propagation patterns between individuals.

The present system provides a high quality, inexpensive, and nearly real-time tool for evaluating the effectiveness and health of a the image of a company and image-affecting activities. The ability to perform such evaluations in the real world rather than in experimental focus groups can be a powerful and important tool for marketing, advertising, and image control. For example, a company launching a new advertising campaign can gain significant value from being able to judge and subsequently tune the effectiveness of the campaign. To the extent that the blogging community is representative of a target audience for such an advertising campaign, marketers can measure uptake of key messages by defining and tracking the appropriate topics. The topic model may be used in the development of public relations campaigns, as well.

Typically a company is required to select among a wide variety of distinct possible emphases for an advertisement or a press release. As discussed previously, high-chatter topics tend to exhibit larger spikes; thus choosing to emphasize a high-chatter topic or subtopic can increase the likelihood of the message eliciting a large reaction. The chatter level on a topic can potentially also be used for keeping tabs on the "mindshare" that a company has. High visibility companies such as Microsoft and Apple exhibit a high chatter level; tracking this chatter provides an early view of trends in share and perception.

Resonance is the phenomenon in which a massive response in the community is triggered by a minute event in the real world. It is an extremely rare phenomenon. The present system can be used to understand the source of resonance in networks such as, for example, blogspace. Though observation of the spontaneous generation of order from chaos is known, reference is made for example to S. Strogatz, "*Sync: The emerging science of spontaneous order*", Hyperion, 2003, through access to blog data the present system can shed new insight on this type of phenomenon. Reference is made to M. Gladwell, "*The Tipping Point: How little things can make a big difference*", Little Brown & Co., 2000 for additional information on how a clearer understanding of the cause of resonance can have massive implications for marketing objectives.

All of these phenomena require that the topics of the conversation be identified so that higher level analytical approaches may be used to find business relevant results. The present system may be embodied in a utility program such as a topic segmentation utility program. The present system provides means for the user to identify a set of input data on which the present system performs segmentation of topics. The present system further provides means for the user to specify chatter criteria by which the topic segmentation utility program can identify a point at which all topics of interest have been removed form the input data. The user selects the input data, specifies chatter criteria, and then invokes the topic segmentation utility program to segment the input data into a time-based topic structure.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Communication: The transmission of information, such as thoughts or ideas from one party to another either contemporarily, such as a face to face conversation, or in a more turn-based format, such as bulletin boards, etc.

Chatter: Internally driven, sustained discussion among parties involved in a conversation or communication.

Conversation: A collection of communications between multiple parties on an "loosely" focused topic.

Internet: A collection of interconnected public and private computer networks that are linked together with routers by a set of standards protocols to form a global, distributed network.

Meme: A unit of cultural information such as a cultural practice or idea that is transmitted verbally or by repeated action from one mind to another.

Spikes: Externally induced sharp rises in instances of a topic among parties involved in a conversation or communication.

Topic: A union of chatter and spikes about a variety of subtopics.

Weblog (Blog): A Web page that that serves as a publicly accessible personal journal for an individual. Typically updated daily, blogs have become a form of artistic expression, enabling anyone to personally publish a diary or a directory about a subject that interests them.

World Wide Web (WWW, also Web): An Internet client-server hypertext distributed information retrieval system.

Figure 1:
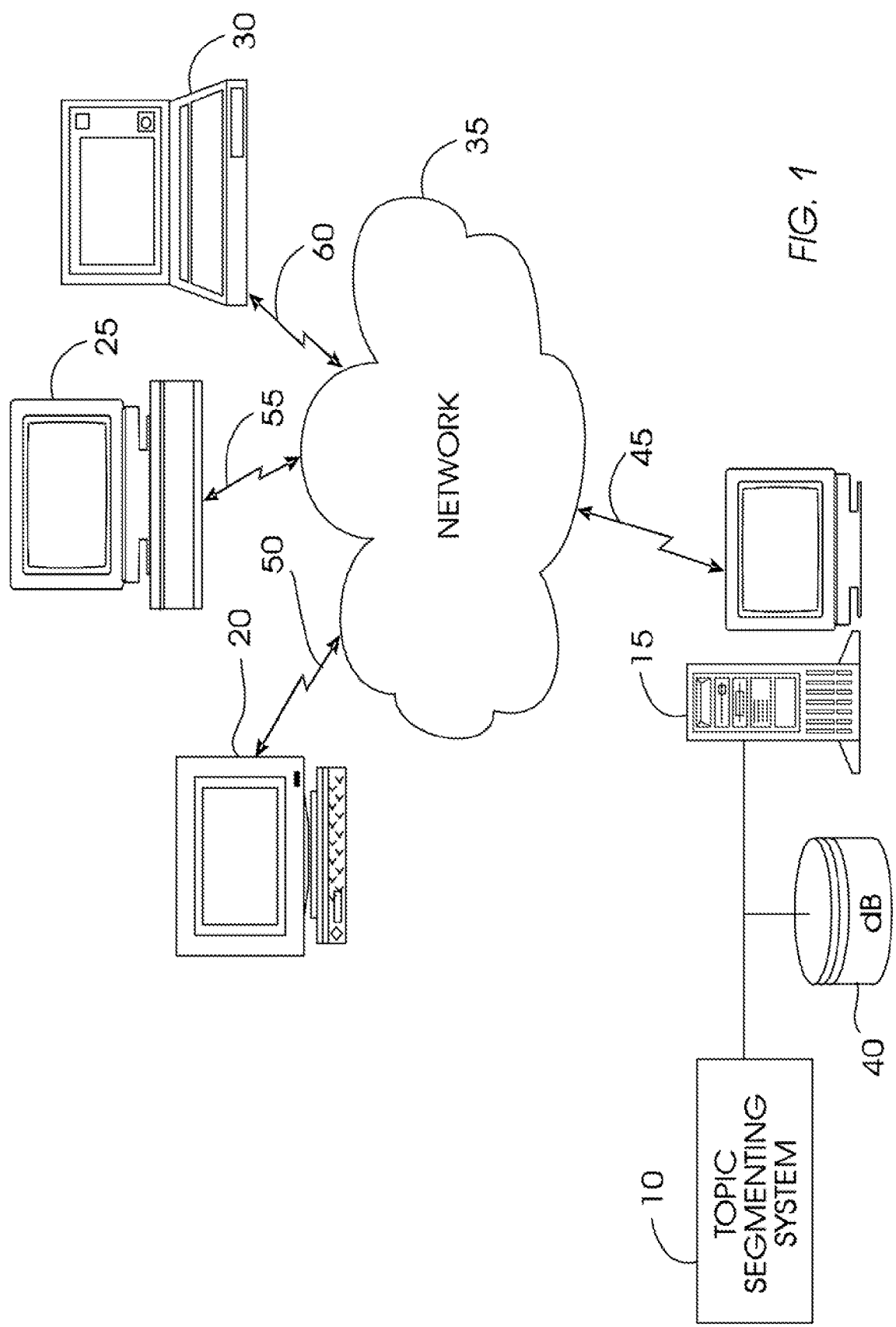
FIG. 1 is a schematic illustration of an exemplary operating environment in which a topic segmenting system of the present invention can be used.

FIG. 1 portrays an exemplary overall environment in which a system, a service, a computer program product, and an associated method (the "system 10") for segmenting a topic into chatter and subtopics according to the present invention may be used. System 10 comprises a software programming code or a computer program product that is typically embedded within, or installed on a host server 15. Alternatively, system 10 can be saved on a suitable storage medium such as a diskette, a CD, a hard drive, or like devices.

Users, such as remote Internet users, are represented by a variety of computers such as computers 20, 25, 30, and can access the host server 15 through a network 35. In one embodiment, system 10 induces a pattern of communication from data stored on a database (dB) 40. Users access the induced pattern of communication. In another embodiment, users provide data to system 10; system 10 then induces a pattern of communication for the user. Output from system 10 is stored on dB 40 or on a storage repository of the user.

Computers 20, 25, 30 each comprise software that allows the user to interface securely with the host server 15. The host server 15 is connected to network 35 via a communications link 45 such as a telephone, cable, or satellite link. Computers 20, 25, 30, can be connected to network 35 via communications links 50, 55, 60, respectively. While system 10 is described in terms of network 35, computers 20, 25, 30 may also access system 10 locally rather than remotely. Computers 20, 25, 30 may access system 10 either manually, or automatically through the use of an application.

Figure 2:
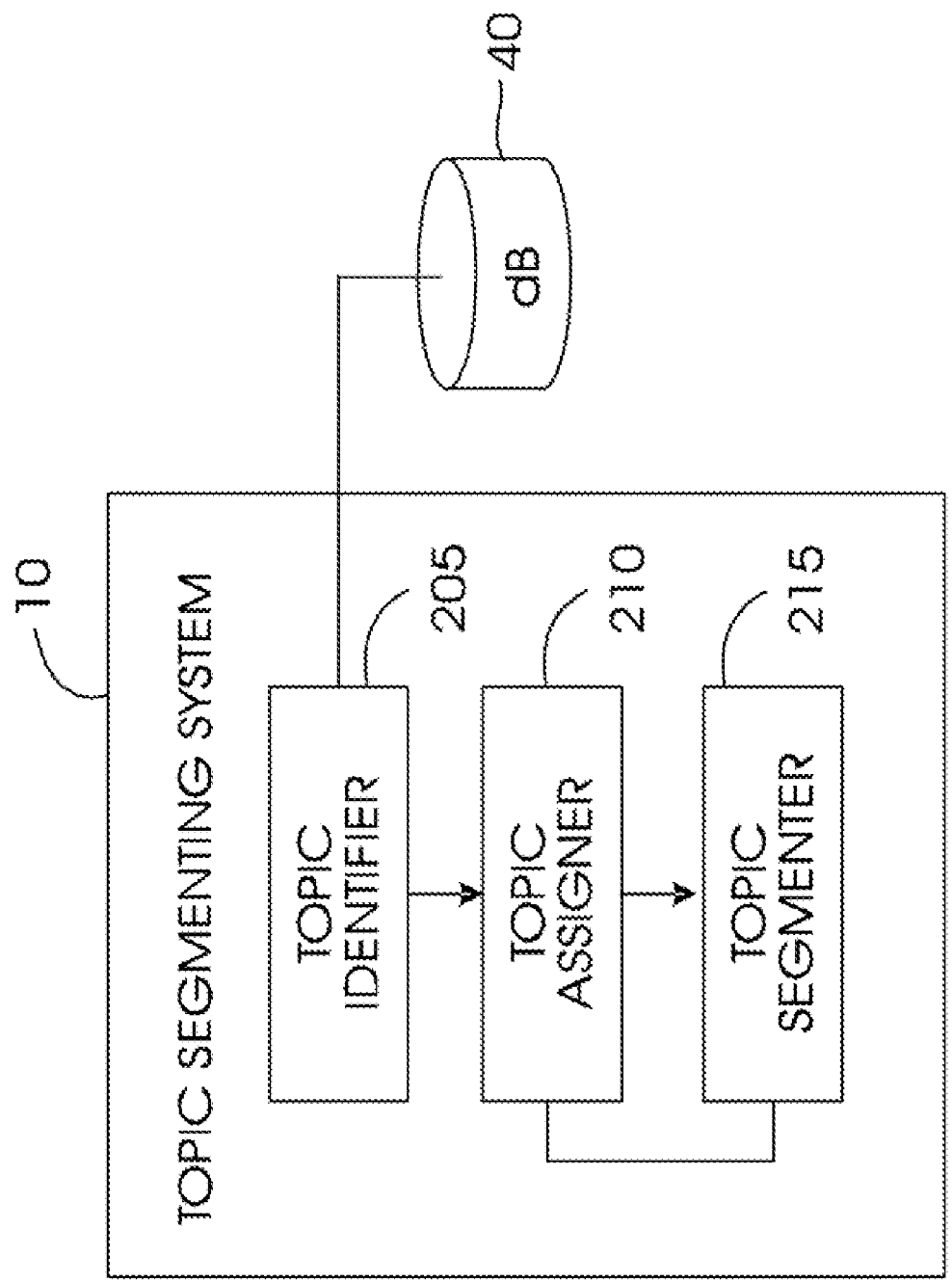
FIG. 2 is a block diagram of the high-level architecture of the topic segmenting system of FIG. 1.

FIG. 2 illustrates a high-level architecture of system 10. System 10 comprises a topic identifier 205, a topic assigner 210, and a topic segmenter 215. The topic identifier 205 identifies topics in input data received from, for example, dB 40. In one embodiment, the topic identifier 205 receives data from any source of information from which topics may be discerned such as, for example, a data repository of a user, a stream of data, etc. The input data represents a conversation in which topics can be discerned. The topic assigner 210 assigns a topic to instances associated with the topic. In one embodiment, instances are postings on weblogs in which the topic appears. In another embodiment, instances can be any unit of conversation from which a topic can be discerned such as documents, emails, bulletin board postings, images, audio segments, voice mail messages, etc. The topic segmenter 215 removes instances associated with the topic from the data.

Figure 3A:
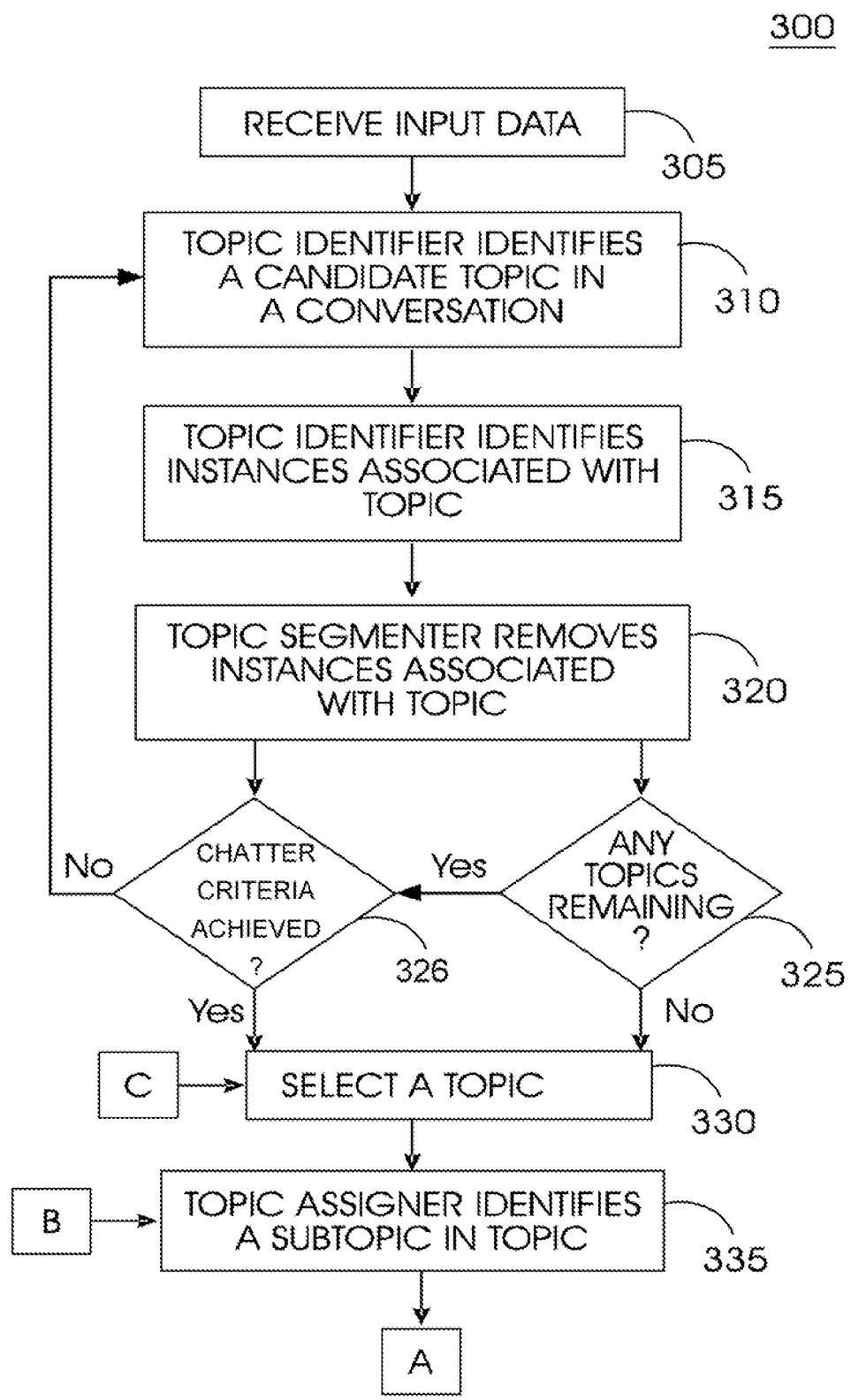
FIG. 3 is comprised of FIGS. 3A and 3B and represents a process flow chart illustrating a method of operation of the topic segmenting system of FIGS. 1 and 2.
Figure 3B:
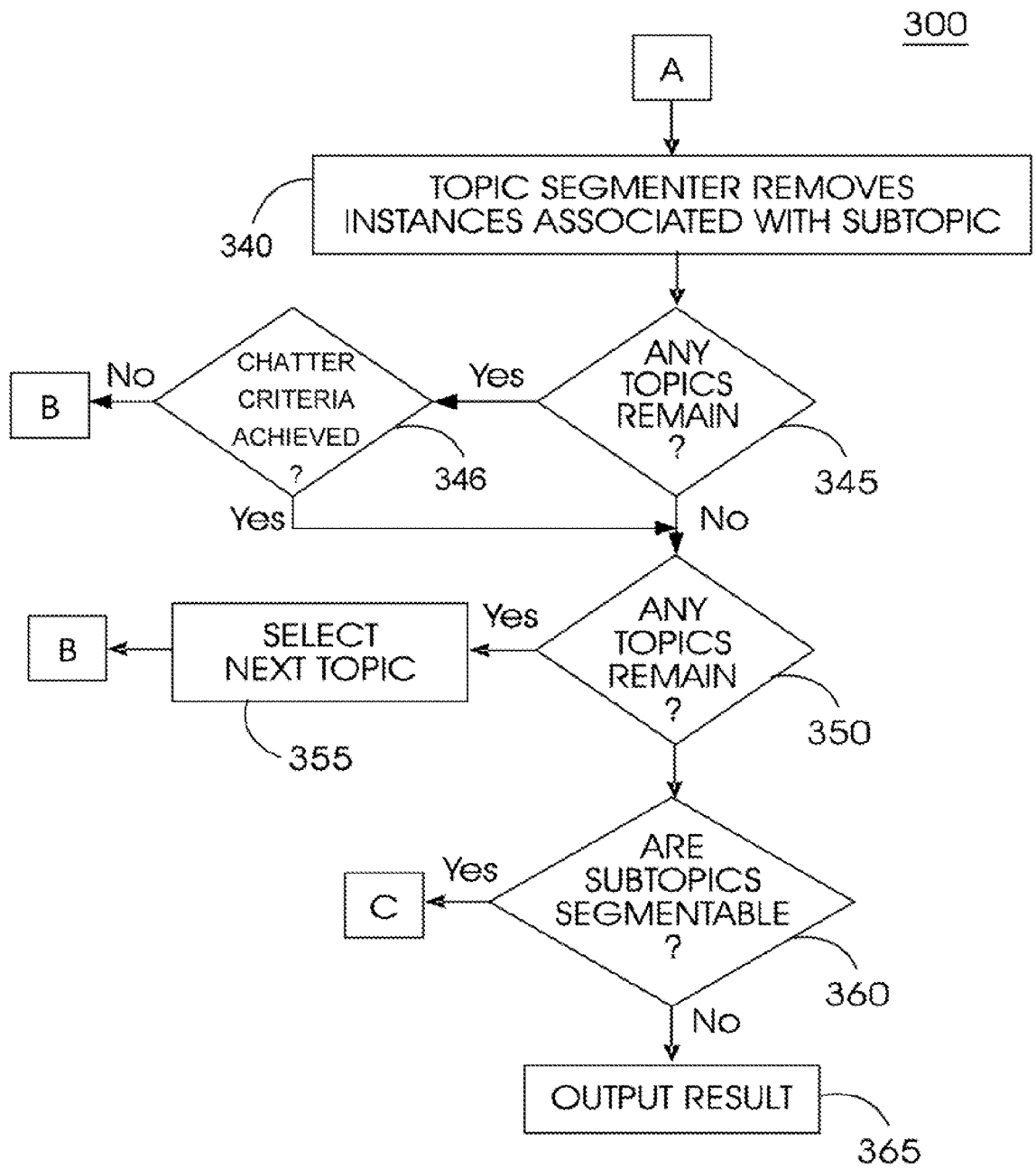

FIG. 3 (FIGS. 3A, 3B) illustrates a method 300 of operation of system 10. System 10 receives input data (step 305). The topic identifier 205 identifies a candidate topic in a conversation (step 310). The topic assigner identifies the instances associated with the topic in the conversation (step 315). The topic segmenter 215 removes the instances from the conversation (step 320). The removed instances form a coherent conversation regarding the topic that can be plotted with respect to a unit of time such as, for example, a day. System 10 determines if any topics remain in the conversation (decision step 325). If additional topics remain for segmentation, system 10 returns to step 310 and repeats steps 310 through 325 until predetermined chatter criteria for topic segmentation has been achieved in segmenting the conversation (step 326).

System 10 may further segment topics into subtopics. The topic identifier 205 selects a topic from among the topics discovered in the conversation (step 330). The topic assigner 210 identifies a subtopic in the topic (step 335). The topic segmenter 215 removes instances associated with the subtopic from the topic (step 340). System 10 determines whether any subtopics remain for decomposition in the topic (decision step 345). If additional subtopics remain for decomposition, system 10 returns to step 335 and repeats step 335 through 345 until predetermined chatter criteria for subtopic segmentation has been achieved in the subtopic (step 346).

System 10 determines whether any topics remain for decomposition (decision step 350). If addition topics can be segmented, system 10 selects the next topic (step 355) and returns to step 335, repeating steps 335 through 350 until all topics have been segmented into subtopics.

System 10 segments subtopics into further subtopics until each topic has been completely segmented according to predetermined criteria. System 10 determines if a subtopic can be segmented (decision step 360). If so, the subtopic is assigned topic status and processing returns to step 330, repeating steps 330 through 360 until all subtopics have been segmented according to predetermined chatter criteria for topic segmentation. System 10 then outputs results as a one or more topics segmented in a time-based structure (step 360).

System 10 focuses on short-term behavior of topics over weeks or months while the background "chatter" topics are assumed to remain fixed. System 10 provides views into a number of important topics at different levels (very focused to very broad) with good representatives of all classes of topics.

System 10 comprises a variety of methods for determining valid topics within a conversation. System 10 comprises references to particular websites as topics, in the sense that bloggers read about these "interesting" sites in another blog and then choose to write about them. System 10 further comprises recurring sequences of words using sequential pattern mining [reference is made to R. Agrawal, et al., "Mining sequential patterns", In *Proc. ICDE*, pages 3-14, 1995]. In addition, system 10 comprises references to entities defined in the TAP ontology [reference is made to R. V. Guha, et al., "TAP: A system for integrating web services into a global knowledge base"]. System 10 further comprises naive formulation of proper nouns: all repeated sequences of uppercase words surrounded by lowercase text.

In addition, system 10 considers individual terms under a ranking designed to discover "interesting" terms. System 10 ranks a term t by the ratio of the number of times that t is mentioned on a particular day i (the term frequency tf(i)) to the average number of times t was mentioned on previous days (the cumulative inverse document frequency). More formally, $$tfcidf(i) = \frac{(i-1)tf(i)}{\sum_{j=0}^{i-1} tf(j)}.$$

System uses a threshold for tf(i) and tfcidf(i) to generate the terms. For example, a threshold of tf(i)>10 and tfcidf(i)>3 is used to generate 20,000 relevant terms in an exemplary conversation. In one embodiment, any suitable method may be used by system 10 to identify topics within the conversation.

All features extracted using any of these methods are then identified by system 10 wherever they occur in the conversation. When applied to data extracted from blogs, system 10 extracts the features with metadata indicating the date and blog of occurrence.

There is a community of bloggers interested in any topic that appears in postings. On any given day, some of the bloggers express new thoughts on the topic, or react to topical postings by other bloggers. This constitutes a chatter on that topic.

Occasionally, an event occurring in the real world induces a reaction from bloggers and a spike appears in the number of postings on a topic. Spikes do not typically propagate through blogspace, in the sense that bloggers typically learn about spikes not from other blogs, but instead from a broad range of channels comprising, for example, mainstream media. Consequently, system 10 assumes all informed parties such as authors of blogs are aware of the topical event and have an opportunity to write about it.

On rare occasions, the chatter reaches resonance, i.e., someone makes a posting to which everyone reacts sharply, thereby causing a spike. The main characteristic of resonance is that a spike arises from either no external input or a very small external input. The formation of order (a spike) out of chaos (chatter) has been observed in a variety of situations [reference is made to Steven Strogatz, "*Sync: The emerging science of spontaneous order*", Hyperion, 2003.].

Depending on the average chatter level and pertinence of the topic to the real world, system 10 places topics into one of the following categories:

Just Spike: Topics that at some point transition from inactive to very active then back to inactive. These topics have a very low chatter level.

Spiky Chatter: Topics that have a significant chatter level and that are very sensitive to external world events. Spiky chatter topics react quickly and strongly to external events, and therefore have many spikes.

Mostly Chatter: Topics that are continuously discussed at relatively moderate levels through the entire period of a discussion window, with small variation from the mean.

Figure 4:
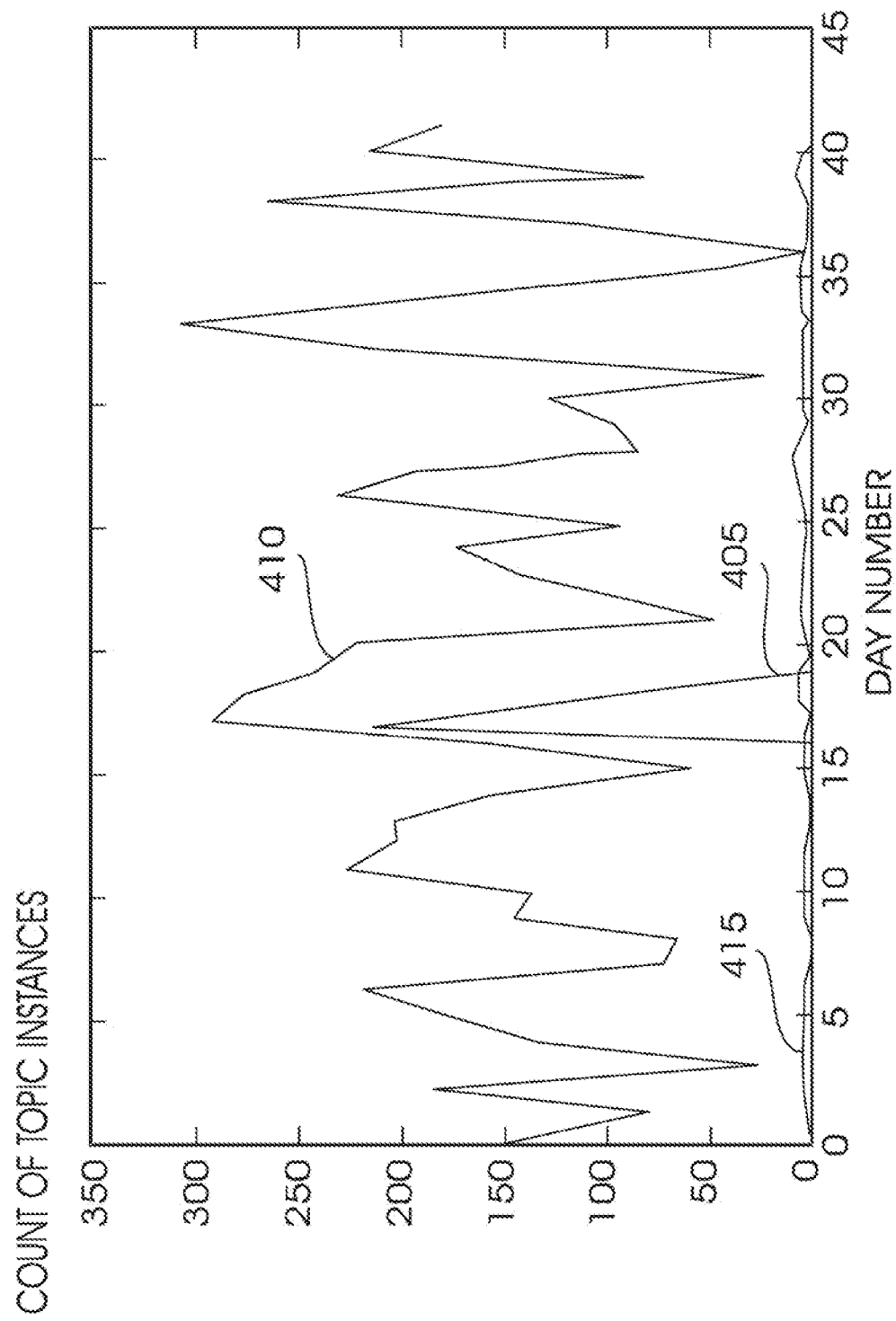
FIG. 4 is a graph illustrating topic categories utilized by the topic segmenting system of FIGS. 1 and 2.

FIG. 4 illustrates the topic categories in a graph plotting count of topic instances with respect to day number. A just spike is illustrated by line 405. Spiky chatter is illustrated by line 410. Mostly chatter is illustrated by line 415.

Spiky chatter topics typically have a fairly high level of chatter, with parties responding to external world events with a spike; their persistent existence is what differentiates spiky chatter from spikes. Spiky chatter comprises a superposition of additional spikes. Spiky chatter further comprises a set of background discussion unrelated to any particular current event.

A community associated with a topic can be seen as randomly choosing a subtopic and posting about it. When an external world event occurs, it is often particular to something very specific such as a newsworthy event or a product announcement. This world event may be a subtopic of a complex topic. The process of system 10 in considering subtopic-based analysis is illustrated by a case study using spikes in a complex topic regarding the term "operating system".

System 10 uses a multi-step process to identify some key terms for this experiment. System 10 examines every proper noun x that co-occurs with the target term "operating system" in the data. For each proper noun, system 10 computes a support s (the number of times that x co-occurs with the target topic) and the reverse confidence $c_r := P(\text{target} | x)$.

Thresholds for s and $c_r$ are manipulated to generate rational term sets. One approach may be for system 10 to examine the occurrences of the terms and to define a spike as an area where the instances in a time period such as a day exceeds $\mu + 2\sigma$. System 10 extends the area to either side until a local minimum less than the mean is reached. Instances that occur during these intervals are referenced spike posts.

Having identified the top coverage terms, system 10 deletes spike posts related to one of the identified terms from the "operating system" topic. The results are plotted in FIG. 5. The de-spiked posts line (line 505) shows a considerable reduction in the spikes of the "operating system" line (line 510), with minor reduction elsewhere. Even in the spiky area system 10 is not achieving a complete reduction, suggesting that not all the synonymous terms for those spike events have been identified or that subtopic spikes may be correlated with a latent general topic spike as well.

System 10 further explores and segments the subtopic "Windows®" as one of the subtopics of "operating system". System 10 performs the proper noun selection as before, generating the term set in Table 1. There may be some duplication of terms from the segmentation of "operating system" as "operating system" and "Windows" overlap significantly. However, some terms unique to "Windows" appear.

TABLE 1

Top coverage spike terms identified by system 10 for the term "Windows ®".

| Series | Server | Os | Longhorn |
|--------|--------|----|----------|
| PC | IE | Mac | GUI |
| ui | Ram | xp | Explorer |
| drm | Unix | pcs | Linux |
| ms | macs | quicktime | Macintosh |

Figure 5:
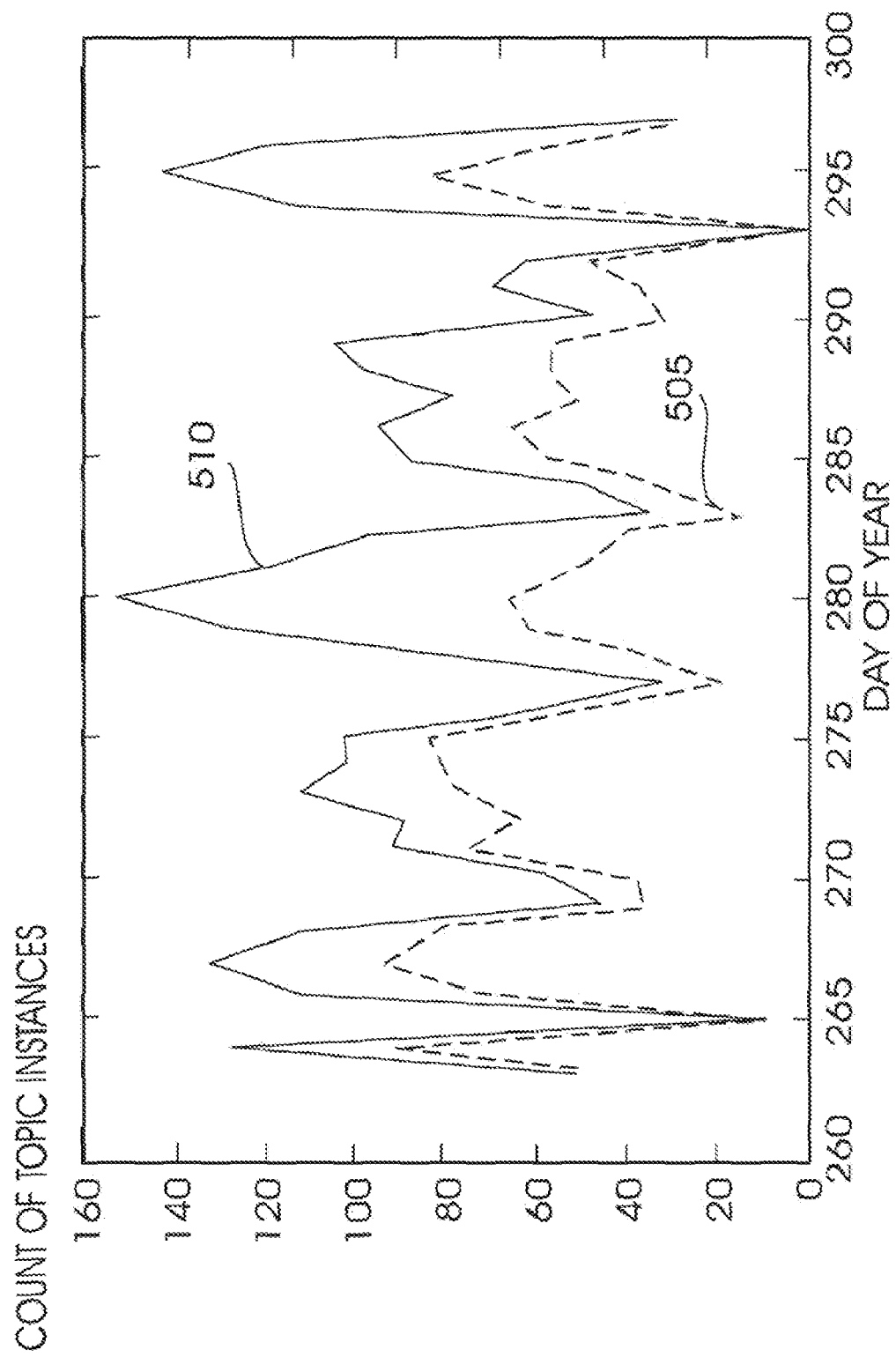
FIG. 5 is a graph illustrating an exemplary input data in which the topic segmenting system of FIGS. 1 and 2 removes spikes related to a term "operating system"
Figure 6:
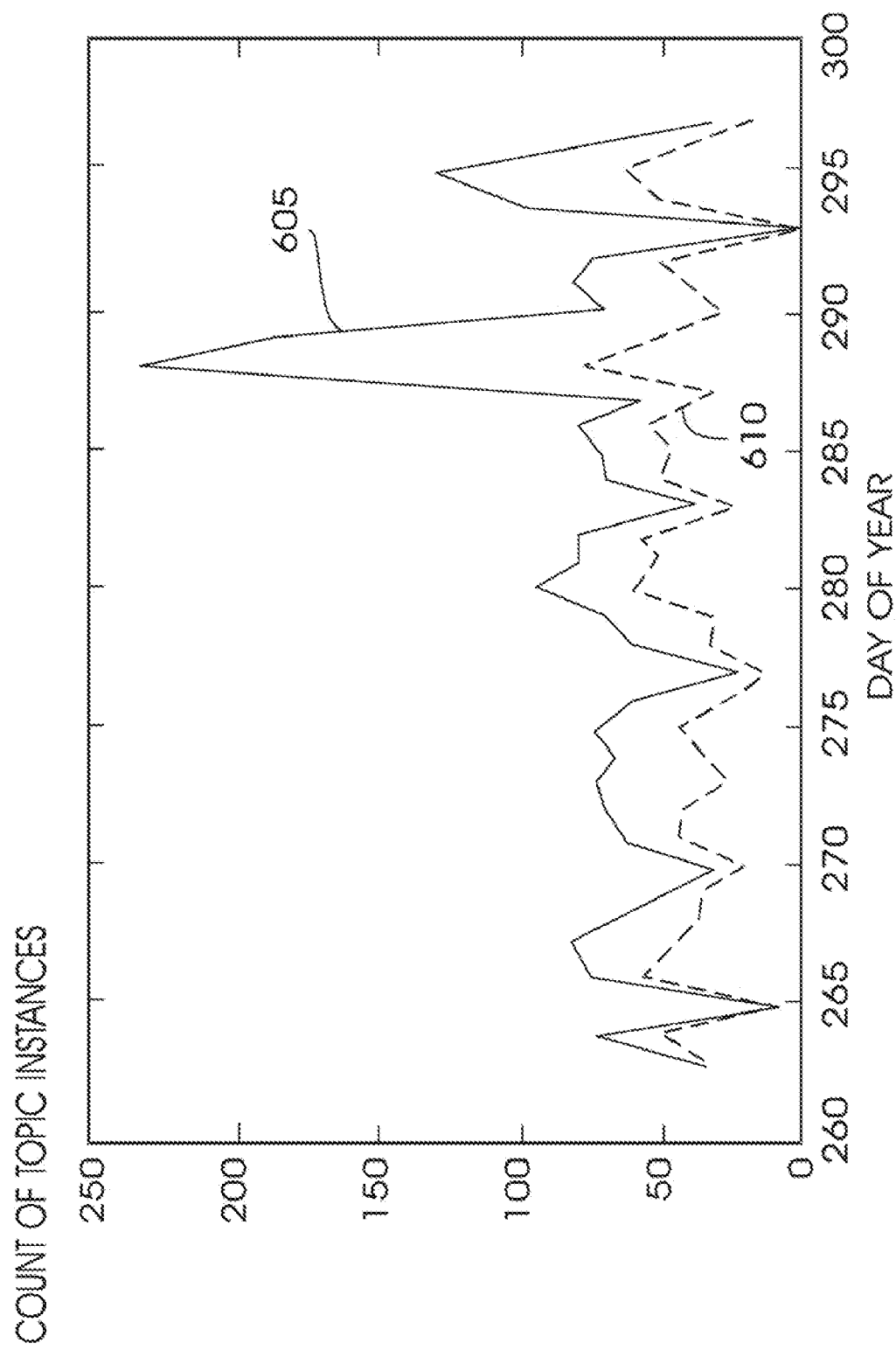
FIG. 6 is a graph illustrating an exemplary topic in which the topic segmenting system of FIGS. 1 and 2 removes spikes related to subtopics of a term "Windows®".

FIG. 6 illustrates the results of system 10 applying these terms to the "Windows®" posting frequency of FIG. 5. By applying these terms to the "Windows®" posting frequency illustrated by line 605, mostly chatter is left as illustrated by line 610. Line 610 has relatively little amplitude compared to line 605 and no noticeable spikes. System 10 achieves a similar reduction in spikes as for FIG. 5, indicating that system 10 has found much of the spiky behavior of this topic. As expected with a more focused topic, the top 20 spike terms have more complete coverage for "Windows" (removing more of the spikes) than for "operating system", leaving a fairly uniform chatter.

System 10 comprises measurements to quantify the nature of the spikes utilizes by system 10. Each chatter topic can be characterized by parameters corresponding to a chatter level and a spike pattern. The chatter level can be represented, for example, by a distribution of the number of posts per day. The spike pattern can be represented, for example, by a frequency, a volume, and a shape of a spike.

It is to be understood that the specific embodiments of the invention that have been described are merely illustrative of certain applications of the principle of the present invention. Numerous modifications may be made to a system, method, and service for segmenting a topic into chatter and subtopics described herein without departing from the spirit and scope of the present invention. Moreover, while the present invention is described for illustration purpose only in relation to the WWW, it should be clear that the invention is applicable as well to, for example, data derived from communication between parties in any format. Further, while the present invention is described for illustration purposes in relation to weblogs or written communication, it should be clear that the invention is applicable as well to, for example, verbal communication or visual communication in any format provided a topic can be derived from the communication.

What is claimed is:

1. A processor-implemented method of segmenting a complex topic into a plurality of spiky subtopics, comprising:
    receiving a conversation containing the complex topic;
    identifying a spiky subtopic in the conversation;
    identifying instances associated with the spiky subtopic;
    removing the instances associated with the spiky subtopic;
    recursively identifying additional spiky subtopics in the conversation and removing instances associated with the additional spiky subtopics until a predetermined chatter criterion for topic segmentation has been achieved; and
    selectively outputting at least some of the plurality of spiky subtopics to produce a time-based structure for topics and subtopics in the conversation.

2. The method of claim 1, wherein the complex topic comprises chatter.

3. The method of claim 2, wherein recursively identifying additional spiky subtopics in the conversation comprises examining the at least some of the additional spiky subtopics for further decomposition.

4. The method of claim 3, wherein examining the at least some of the additional spiky subtopics for further decomposition comprises decomposing the additional spiky subtopics into at least two topics and chatter.

5. The method of claim 4, wherein examining the at least some of the additional spiky subtopics for further decomposition comprises using a heuristic approximation approach.

6. The method of claim 2, wherein the conversation contains a blog stream.

7. The method of claim 6, wherein identifying the spiky subtopic in the conversation comprises identifying the spiky subtopic in the blog stream.

8. The method of claim 7, wherein the blog stream comprises a stream of articles.

9. The method of claim 8, wherein the blog stream of articles comprises data.

10. The method of claim 8, wherein identifying the spiky subtopic in the blog stream comprises searching for a predetermined keyword.

11. A computer program product having a plurality of executable instruction codes stored on a computer readable medium for segmenting a complex topic into a plurality of spiky subtopics, comprising:
   a first set of instruction codes for receiving a conversation containing the complex topic;
   a second set of instruction codes for identifying a spiky subtopic in the conversation;
   a third set of instruction codes for identifying instances associated with the spiky subtopic;
   a fourth set of instruction codes for removing the instances associated with the spiky subtopic;
   a fifth set of instruction codes for recursively identifying additional spiky subtopics in the conversation and removing instances associated with the additional spiky subtopics until a predetermined chatter criterion for topic segmentation has been achieved; and
   a sixth set of instruction codes for selectively outputting at least some of the plurality of spiky subtopics to produce a time-based structure for topics and subtopics in the conversation.

12. The computer program product of claim 11, wherein the complex topic comprises chatter.

13. The computer program product of claim 12, wherein the fifth set of instruction codes examines the at least some of the additional spiky subtopics for further decomposition.

14. The computer program product of claim 13, wherein the fifth set of instruction codes decomposes the additional spiky subtopics into at least two topics and chatter.

15. The computer program product of claim 14, wherein the fifth set of instruction codes examines the at least some of the additional spiky subtopics for further decomposition by means of a heuristic approximation approach.

16. The computer program product of claim 12, wherein the conversation contains a blog stream.

17. The computer program product of claim 16, wherein the second set of instruction codes identifies the spiky subtopic in the blog stream.

18. The computer program product of claim 17, wherein the blog stream comprises a stream of articles.

19. The computer program product of claim 18, wherein the blog stream of articles comprises data.

20. The computer program product of claim 18, wherein the second set of instruction codes further searches for a predetermined keyword.

21. A processor-implemented system for segmenting a complex topic into a plurality of spiky subtopics, comprising:
   a topic identifier receiving a conversation containing the complex topic, and identifies a spiky subtopic in the conversation;
   a topic assigner, connected to the topic identifier, for identifying instances associated with the spiky subtopic;
   a topic segmenter, connected to the topic assigner, for removing the instances associated with the spiky subtopic;
   wherein the topic identifier, the topic assigner, and the topic segmenter recursively identify additional spiky subtopics in the conversation and remove instances associated with the additional spiky subtopics until a predetermined chatter criterion for topic segmentation has been achieved; and
   wherein at least some of the plurality of spiky subtopics are selectively outputted to produce a time-based structure for topics and subtopics in the conversation.

22. The system of claim 21, wherein the complex topic comprises chatter.

23. The system at claim 22, wherein the conversation contains a blog stream.

24. The system of claim 23, wherein the blog stream comprises a stream of articles.

25. The system of claim 24, wherein the blog stream of articles comprises data.

* * * * *